C. MARSH, 2nd.
Plows.
No. 142,800.　　　　　　　　　Patented September 16, 1873.
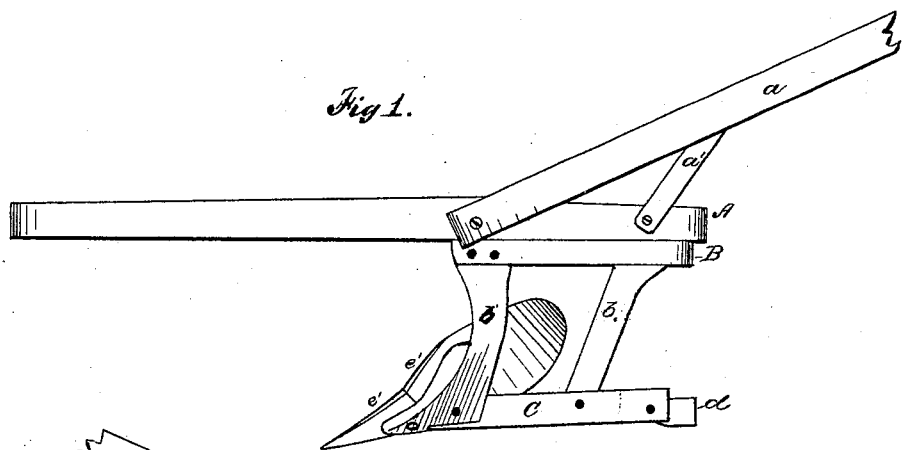
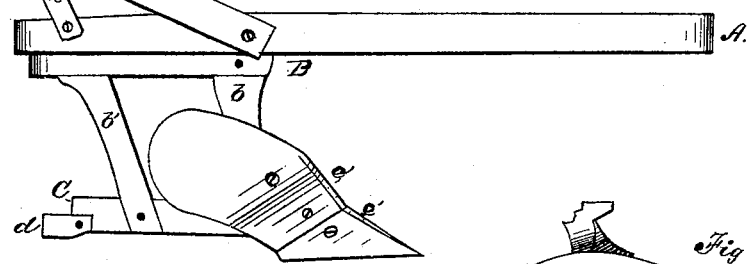
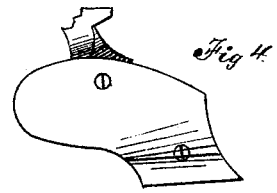
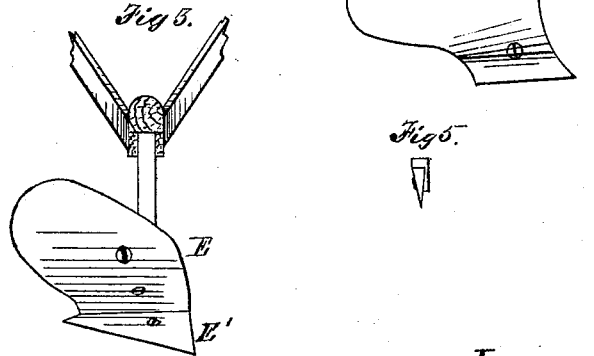
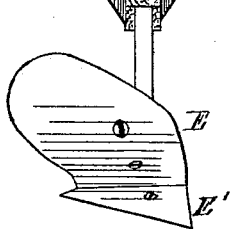
Witnesses
H. Carlin Clark
H. E. Matthews
Inventor.
Cyrus Marsh 2nd
by Dyer, Beadle & Co.
Att'ys

UNITED STATES PATENT OFFICE.

CYRUS MARSH, 2D, OF NATCHEZ, MISSISSIPPI.

IMPROVEMENT IN PLOWS.

Specification forming part of Letters Patent No. 142,800, dated September 16, 1873; application filed September 6, 1872.

*To all whom it may concern:*

Be it known that I, CYRUS MARSH, 2d, of Natchez, in the county of Adams and State of Mississippi, have invented a new and useful Improvement in Plows; and I do hereby declare that the following is a full and exact description of the same, reference being had to the accompanying drawings and to the letters of reference marked thereon.

This invention is an improved plow of simple construction, the novelty of which mainly consists of the peculiar details of construction, by means of which it is caused to run with great accuracy and little friction.

In the drawings, Figures 1 and 2 represent side elevations of my improved plow from opposite sides: Fig. 3, a front elevation of the same; Fig. 4, a detached view of a scraper-blade; and Fig. 5, an end view of a heel-plate detached.

To enable others skilled in the art to make and use my invention, I will now proceed to describe fully its construction and manner of operation.

A represents the plow-beam, constructed in any proper manner and of any suitable material, which is provided with the handles $a\ a$ and braces $a'\ a'$, as shown. B represents a bar of suitable length, removably attached to the rear end of beam A, to which is attached the standard $b$ and brace $b'$, as shown. C represents the land-side, constructed of suitable material, and provided in front with a recess to receive the front of the standard $b$ and brace $b'$, as shown in Fig. 1, and near its rear end with a recess to receive the front of the standard $b'$, as shown in Fig. 2. If desired, the parts B $b\ b'$ may be cast in one piece. The extreme rear end of the land-side is provided, also, with a recess for the reception of a heel-plate, $d$, constructed of any suitable material, and preferably provided with a sharp edge, as shown in Fig. 5. E represents the share, and E' the point, both of which are secured in any proper manner to the extended bearing-plate of the standard $b$, as shown. The edges of these parts are turned forward for the purpose of making them effective for cutting the earth, as shown at $e'$.

It will be observed that the share and point are so attached to the standard that they operate to cut the earth beyond the line of the standard and land-side, so that the latter parts do not move in contact with the cut edge of the earth, as is usually the case.

If desired, the part E' may be dispensed with and a scraper-blade be used, as shown in Fig. 4.

The operation of my improved plow is as follows: It is used, of course, generally in a similar manner to other plows of this class. The manner of uniting the share to the standard is specially advantageous, because the standard and land-side are removed from contact with the cut wall of earth, and hence the friction of the plow is much reduced.

The employment of the heel-plate $d$ gives the plow great steadiness, causing it to run true, and renders it capable of easy guidance.

By turning the edges of the share forward the plow is adapted to cut its way through the earth instead of tearing its way.

A plow thus constructed, it is believed, will require one-half less power to move it than plows of the same size constructed in the usual manner.

By placing the heel-plate at the extreme end of the land-side, and by extending its cutting-edge below the lower edge of the land-side, the plow is guided easily and with great accuracy.

Having described my invention, what I claim as new therein, and desire to secure by Letters Patent, is—

1. In a plow of substantially the described construction, the independent heel-plate $d$, removably attached to the extreme rear end of the land-side, and extending below the land-side, as described, for the purpose set forth.

2. In a plow of substantially the described construction, the share E, having its cutting edge $e'$ turned forward and located beyond the line of the standard, in combination with a heel-plate located at the rear end of a land-side, as described, for the purpose set forth.

This specification signed and witnessed this 28th day of August, 1872.

C. MARSH, 2D.

Witnesses:
H. P. BARLOW,
WM. GAUNT.